INVENTORS
EDWARD D. OSTROFF
ALFRED G. MARCOTTE
HERBERT E. MILLER

BY *Fred Jacob*
ATTORNEY

June 18, 1963 E. D. OSTROFF ETAL 3,094,629
PULSE RATE TO AMPLITUDE CONVERTER
Filed Oct. 30, 1958 4 Sheets-Sheet 2

INVENTORS
EDWARD D. OSTROFF
ALFRED G. MARCOTTE
HERBERT E. MILLER

BY Fred Jacob
ATTORNEY

INVENTORS
EDWARD D. OSTROFF
ALFRED G. MARCOTTE
HERBERT E. MILLER

United States Patent Office 3,094,629
Patented June 18, 1963

3,094,629
PULSE RATE TO AMPLITUDE CONVERTER
Edward D. Ostroff, South Sudbury, Alfred G. Marcotte, Chelmsford, and Herbert E. Miller, West Acton, Mass., assignors to Laboratory for Electronics, Inc., Boston, Mass., a corporation of Delaware
Filed Oct. 30, 1958, Ser. No. 770,832
8 Claims. (Cl. 307—88.5)

The present invention relates to a rate-to-amplitude converter, in particular a converter for changing a pulse rate which is representative of a measured quantity to a D.C. signal having an amplitude proportional to the pulse rate. The invention further embraces means for providing a carrier signal having a variable amplitude proportional to the pulse rate and a phase reference proportional to the polarity of the pulse rate signal.

In navigational systems, particularly systems of the type using the Doppler effect, the navigational data received is frequently in the form of digital pulse signals having a pulse rate dependent on the measured quantity. Generally, the data is incapable of being employed in this form. Nearly all presently available analog computing systems which utilize Doppler-measured velocities as input data to provide correction signals for inertial platforms, automatic landing aids, bombing or fire control, automatic navigators or the like, accept input data in the form of variable amplitude D.C. signals, or as amplitude modulated carrier signals. Thus, the accurate solution of triangulation problems is readily carried out by a servo system employing 400 cycle operated resolvers. Alternatively, D.C. servo-operated cosine systems may be employed using potentiometers in place of resolvers. Whereas in the first mentioned servo system amplitude modulated 400 cycle carrier input signals proportional to the pulse rate of respective Doppler-measured velocities are required, the D.C. servo system utilizes similarly derived input data in the form of D.C. signals having an amplitude proportional to the pulse rate.

Heretofore, complex circuits, which were expensive to build and maintain, were used to obtain the aforesaid signals. Such circuits frequently employ a binary multiplier and a forward-backward counter, interconnected so that a reference frequency applied to the multiplier will be made equal after multiplication to the input rate $f_x$. As a result, a parallel binary number in the forward-backward counter is obtained which is proportional to the input rate $f_x$. The D.C. levels corresponding to the One and Zero states of the forward-backward counter stages are then used to control a bank of switches in a precision ladder network which converts a reference carrier to a carrier signal having an amplitude proportional to said binary number.

Accordingly, it is a primary object of the invention to provide a simple-rate-to-amplitude converter for supplying an output signal whose amplitude is modulated in accordance with the pulse rate of an incoming input signal. Further objects and advantages will become more apparent from the following detailed specification with reference to the accompanying drawings in which.

Figure 1:
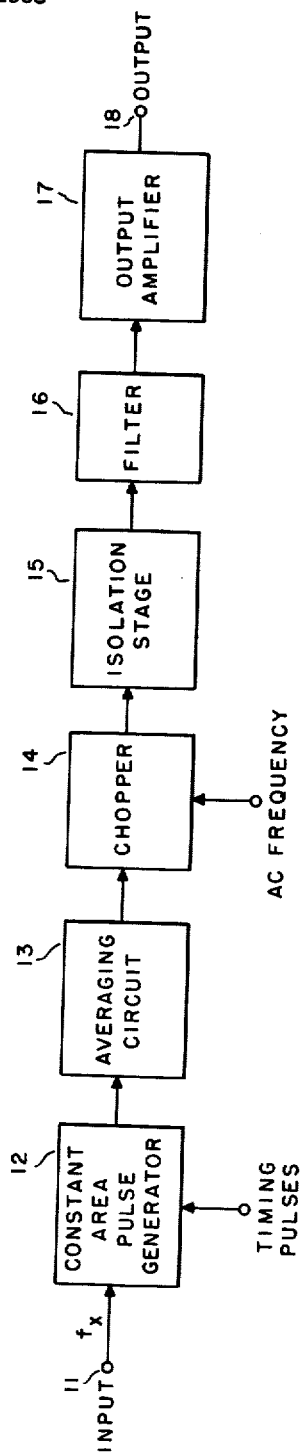
FIG. 1 is a block diagram of the invention herein.

With reference now to FIG. 1, the invention herein is illustrated in block diagram form. An input signal $f_x$, having a pulse rate which varies in accordance with the measured quantity, is applied to a constant area pulse generator which operates by reference against timing signals derived from a clock pulse generator. The output signal of generator 12 consists of pulses of constant width and amplitude occurring at a frequency which corresponds to the pulse rate of input signal $f_x$. The output of generator 12 is applied to averaging circuit 13 wherein the constant area pulses are integrated and a D.C. signal is derived having an amplitude proportional to the aforesaid pulse frequency. This signal may be used directly to control a D.C.-operated servo, or as stated above, it may serve as the input of a precision modulated circuit. In the latter case, the D.C. signal is applied to chopper 14 which, by the application of an external signal having a predetermined A.C. frequency, converts the D.C. output signal of the averaging circuit into an A.C. carrier signal whose amplitude is modulated by the level of the aforesaid D.C. signal. An isolation stage 15 couples filter 16 to the chopper. Filter 16 is tuned to provide the fundamental of the aforesaid predetermined A.C. frequency as an output thereof, said output being applied to amplifier 17. The amplified output signal appears at terminal 18 as an amplitude modulated A.C. carrier signal.

Figure 2:
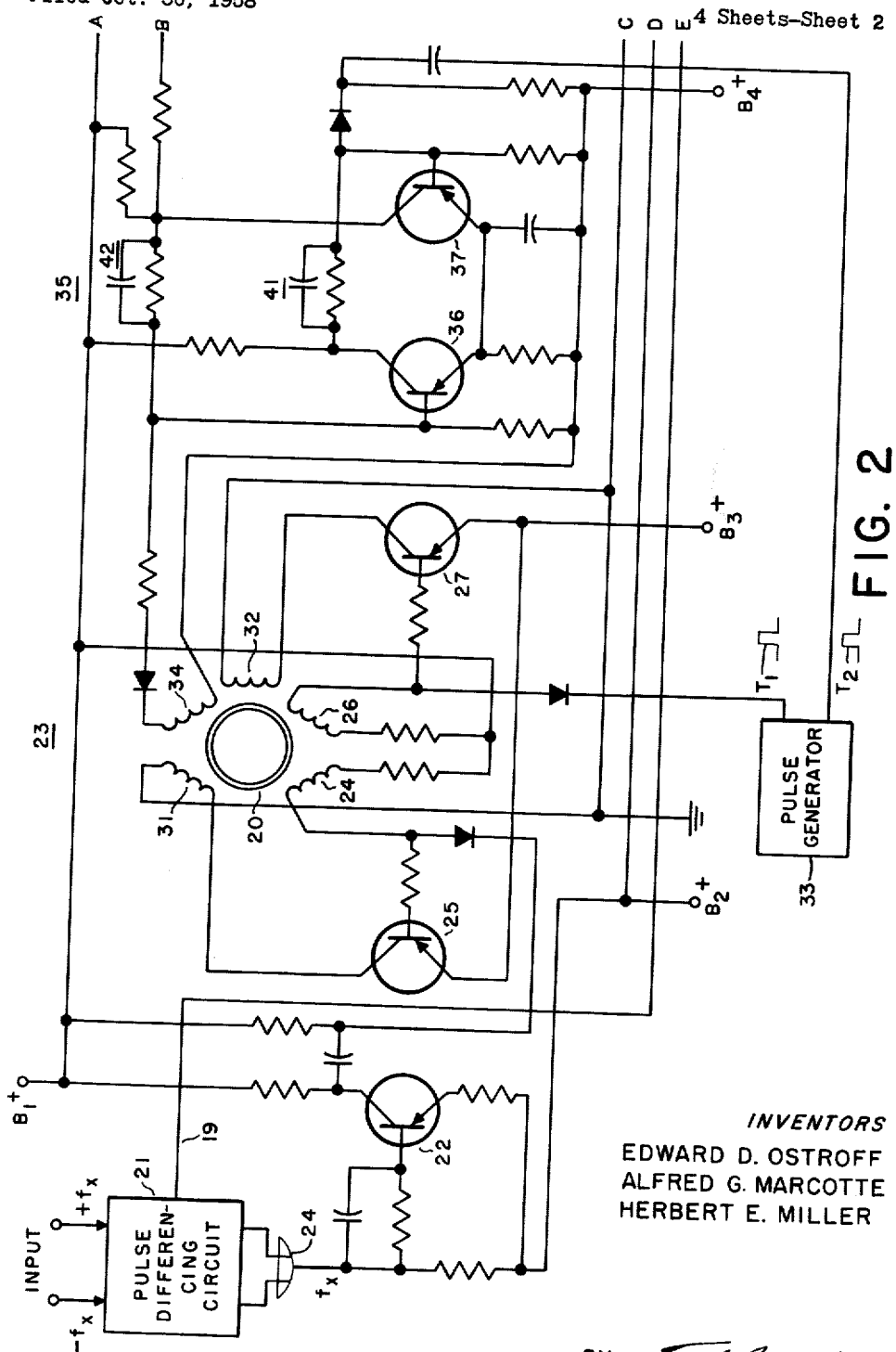
FIGS. 2 and 3 illustrate in schematic form one embodiment of the circuitry employed.
Figure 3:
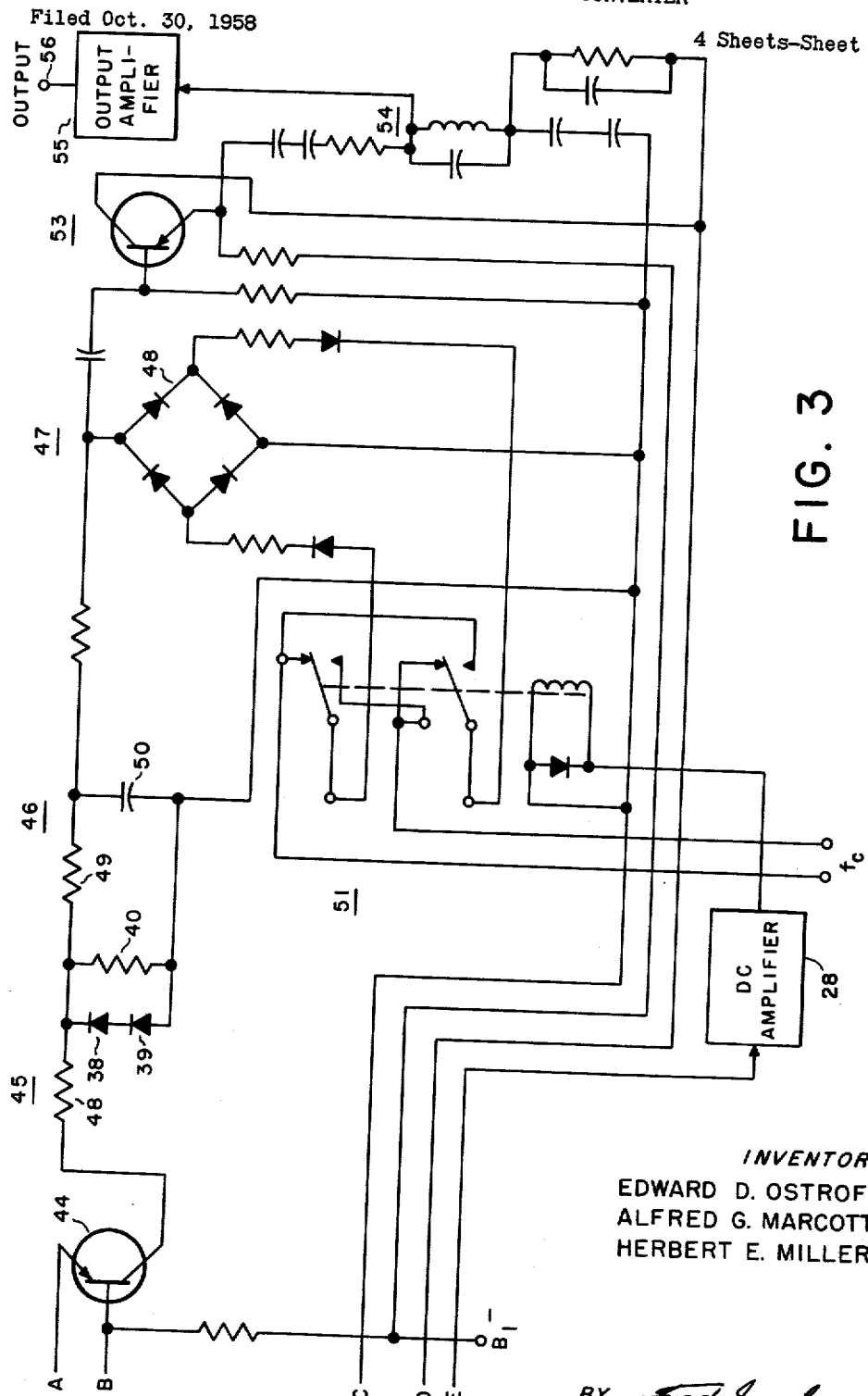

FIGS. 2 and 3 illustrate in schematic form one embodiment of the circuitry employed herein, identically labeled terminals in the two drawings indicating corresponding connections. As will be seen, positive polarity input signal $+f_x$ and negative polarity input signal $-f_x$ are received at the input terminals and are applied to pulse differencing circuit 21. Both input signals $+f_x$ and $-f_x$ respectively, have respective input pulse rates dependent on the quantities being measured, e.g. Doppler velocities. A D.C. control signal, whose polarity is determined by the input signal having the higher rate, is applied to wire 19 whence it is amplified by a D.C. amplifier 28 and is used in a manner explained hereinbelow. Input signals $+f_x$ and $-f_x$ are utilized in pulse differencing circuit 21 to form a signal $f_x$ having a pulse rate equal to the magnitude of the difference of the respective pulse rates of the original input signals. Signal $f_x$ is coupled to the base of a transistor amplifier stage 22, the collector of which is resistively coupled to a first D.C. reference potential $B_1{}^+$, $+22$ volts having been used in one embodiment of the invention. The emitter is resistively coupled to a second D.C. reference potential $B_2{}^+$, $+4$ volts having been used in the aforesaid embodiment of the invention. A synchronizer 23 is coupled to the output of the aforesaid amplification stage. The synchronizer comprises a core 20 having a substantially square loop hysteresis characteristic which carries a plurality of core windings. A first core winding 24 has one terminal thereof resistively coupled to the base of a transistor 25, the other terminal being resistively coupled to the aforesaid first reference potential. A second winding 26 has one terminal resistively coupled to said first reference potential, the other terminal being resistively coupled to the base of a transistor 27. The emitters of transistors 25 and 27 respectively, are connected to a third D.C. reference potential $B_3{}^+$, for example $+18$ volts, while the corresponding collectors are connected to respective terminals of core windings 31 and 32. The other terminals of the aforesaid core windings are referenced to ground. The collector of transistor 22 is diode coupled to said first terminal of core winding 24. A clock pulse generator 33 periodically provides first timing pulses $T_1$ which are diode coupled to said other terminal of core winding 26. A fifth core winding 34 has one terminal thereof diode coupled to the base of a transistor 36 in flip-flop circuit 35 comprising transistors 36 and 37 respectively. The base of each of said last recited transistors is resistively coupled to a fourth reference potential $B_4{}^+$, e.g. $+44$ volts. The other terminal of winding 34 is directly connected to $B_4{}^+$. The emitters of transistors 36 and 37 are connected together and are coupled resistively and capacitively respectively, to said fourth reference potential. The collector of transistor 36 is coupled to the base of transistor 37 by means of parallel resistor capacitor combination 41, while the collector of transistor 37 is coupled to the base of transistor 36 by means of a parallel resistor capacitor combination 42. Both collectors are additionally coupled to the aforesaid first reference potential $B_1^+$. The base of transistor 37 is diode coupled through a condenser to the aforesaid clock pulse generator 33, to receive periodically occurring second timing pulses $T_2$. Each of said last recited pulses occurs a fixed time interval after the corresponding first timing pulse $T_1$. The output of flip-flop circuit 35 is resistor coupled to the base of a transistor 44 (FIG. 3), the emitter of which is connected to the aforesaid first D.C. reference potential $B_1^+$, while its base is resistor coupled to a source of negative D.C. potential $B_1^-$, e.g. —44 volts. Transistor 44 forms part of a clipping circuit 45 which further comprises a resistor 48 coupling the emitter to a pair of Zener diodes 38 and 39. The latter have a reverse breakdown voltage which is stable and a dynamic resistance which is very low after breakdown compared to that of resistor 48. The series diode combination is shunted by a resistor 40 and is connected to ground. Averaging circuit 46 comprises an RC integrator consisting of a series resistor 49 having one terminal coupled to clipping circuit 45 and the other terminal connected to a capacitor 50 which is, in turn, connected to ground. The aforesaid other terminal is further coupled to a chopper 47 which comprises a diode bridge circuit 48 having one node thereof resistively coupled to the aforesaid averaging circuit and having the opposite node connected to ground. The other pair of nodes is connected to the contact of a relay 51. The latter is actuated from pulse differencing circuit 21 and is operative to apply a predetermined A.C. frequency $f_c$ to the D.C. output of the averaging circuit. In one embodiment, a 400 cycle source was used to provide the aforesaid A.C. frequency. The chopper output capacitively coupled to the transistor base of an isolation stage 53 whose emitter and collector are respectively coupled to the aforementioned D.C. sources $B_1^-$ and $B_2^+$. The emitter, in turn, is coupled to a filter 54 which is tuned to the fundamental of freqeuncy $f_c$. The filter comprises a parallel LC combination which is capacitively coupled to ground, as well as a parallel RC combination coupled to the aforesaid second reference potential $B_2^+$. The output of the filter is connected to an amplifier 55, whence it is amplified and applied to output terminal 56.

In operation, pulse signal $f_x$, having an input pulse rate equal to the magnitude of the difference of the pulse rates of $+f_x$ and $-f_x$, is amplified by the circuit which includes transistor 22, whence it is applied to the base of transistor 25 as well as to winding 24 of core 20. The latter has a substantially square loop hysteresis characteristic and is set regeneratively due to the phasing of the core windings by each arriving pulse of signal $f_x$. A subsequently arriving first timing pulse $T_1$ is applied to core winding 26 and resets core 20, provided the latter is in the set state. Upon resetting, an output pulse is derived which is applied to the base of transistor 36 to place the latter in a conductive state. Owing to the connection of the base and collector of the transistor 36 to the collector and base respectively of transistor 37, the latter transistor, which is normally conductive, is rendered nonconductive upon the application of a pulse to transistor 36. A subsequently arriving timing pulse $T_2$, which occurs a predetermined time interval after the occurrence of timing pulse $T_1$, renders transistor 37 conductive again, while transistor 36 ceases to conduct. As a result, the output signal of flip-flop 35, which is applied to the base of transistor 44, consists of pulses having a fixed width, each of said pulses being initated by the occurrence of a timing pulse $T_1$ and being terminated by the occurrence of the corresponding timing pulse $T_2$. These fixed width pulses, upon being amplitude limited by the operation of clipping circuit 45, result in constant area pulses. As such, they are integrated by the RC combination 46 to provide a D.C. signal. The latter has an amplitude which varies in accordance with the frequency of the aforesaid constant area pulses. As previously mentioned, the signal may be used in this form to control a D.C. operated servo. Alternatively, a 400 cycle excitation is applied to relay 51 which, in turn, is actuated by the control signal on wire 19. As a result, the D.C. signal at the output of the integrator is chopped such that an A.C. carrier signal having an amplitude proportional to the level of the aforesaid D.C. signal appears at the base of the transistor comprising isolation stage 53. This signal is applied to filter 54 which is tuned to the fundamental frequency $f_c$, to obtain a signal which is free from harmonics. The latter is applied to output amplifier 55, whence it appears at output terminal 56 as an amplitude modulated carrier frequency signal.

Figure 4:
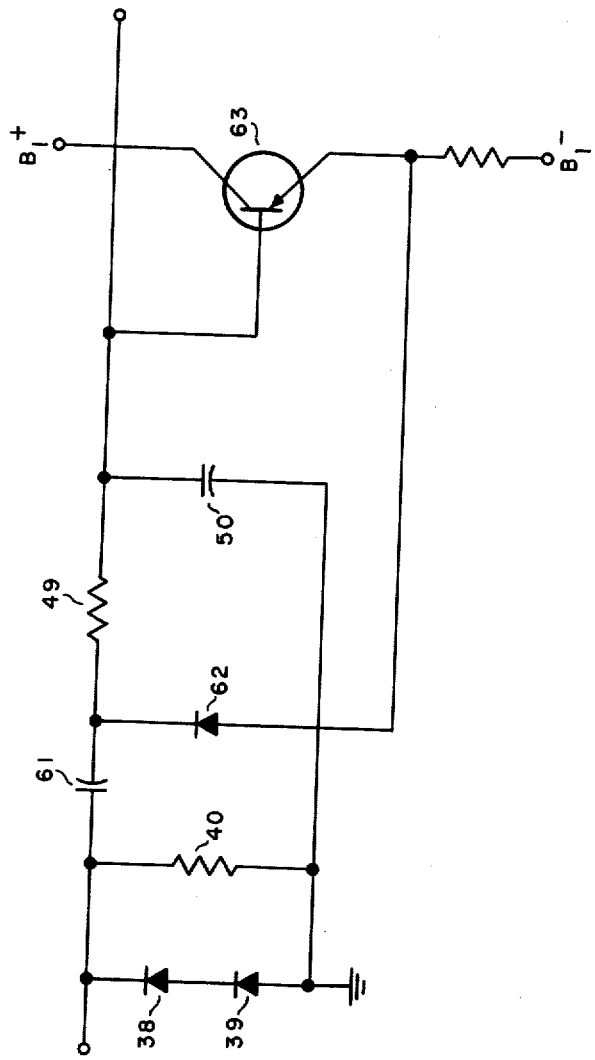
FIG. 4 shows a modification of the averaging circuit of FIGS. 2 and 3.

Inasmuch as the characteristic of averaging circuit 46 is non-linear above a certain output voltage level, its operation is confined to output voltages which are small compared to the reference voltage. For improved linearity over a wide dynamic range the averaging circuit may be modified as shown in FIG. 4, applicable reference numbers having been retained. A capacitor 61 which is large compared to averaging capacitor 50 is inserted in series with resistor 49. An emitter follower 63 has its base connected to capacitor 50, while the emitter and collector are respectively coupled to the aforesaid D.C. sources $B_1^-$ and $B_1^+$. A diode 62 further couples the emitter to capacitor 61. The emitter follower is employed to charge capacitor 50 to a voltage equal to that across capacitor 61. This arrangement permits the linear charging action of capacitor 61 to a voltage that may be many times that of the reference voltage of Zener diodes 38, 39 which determine the amplitude of the input pulse. The circuit further insures that the charging current per pulse is independent of the voltage across capacitor 61, it being proportional to the difference, otherwise, between the reference voltage and the voltage across capacitor 50.

Having thus described the invention, is will be apparent that numerous modifications and departures may now be made by those skilled in the art. Such modifications include the use of the linearizing circuit discussed in connection with FIG. 4. Similarly, the Zener diode arrangement could be replaced by a clamping diode referenced to a stable power supply. Additionally, the A.C. frequency which determines the carrier frequency can vary from D.C. to megacycle frequencies depending on the output requirements. In the latter case it must be borne in mind, however, that the filter must be changed accordingly. In certain applications, the filtering function can be carried out by the servo controlled by the output signal. In such cases filter 55 can be dispensed with entirely. The invention may be further modified by substituting a mechanical chopper for its electronic equivalent. Similarly, various embodiments of the pulse differencing circuit are feasible. Where a very narrow constant pulse width is required, the present constant pulse width circuit could be readily replaced with a magnetic core blocking oscillator. Similar modifications, too numerous to describe, are feasible. Consequently, the invention herein disclosed is to be construed as limited only by the spirit and scope of the appended claims.

What is claimed is:

1. In a rate-to-amplitude converter, a constant area pulse generator comprising a synchronizer, means for applying an input signal having an input pulse rate to said synchronizer, said synchronizer being adapted to be set by said input pulses, means for periodically applying first timing pulses to said synchronizer, said synchronizer in its set state being adapted to be reset by said timing pulses to provide output pulses, a flip flop circuit, means coupling said output pulses to said flip-flop circuit to cause said flip-flop circuit to be set by said output pulses, means for periodically applying second timing pulses to said flip-flop circuit, each of said second timing pulses occurring a predetermined time period after the corresponding first timing pulse, said flip-flop circuit being adapted to be reset by said second timing pulses to provide constant width output pulses, means for amplitude limiting said last recited pulses to provide a constant area pulse signal, an averaging circuit, and means for applying said last recited signal to said averaging circuit to provide a direct current signal varying as a function of the input rate.

2. The apparatus of claim 1 and further comprising a chopper adapted to apply a predetermined frequency to said direct current signal to obtain an amplitude modulated carrier signal, a filter, and means for applying said carrier signal to said filter to obtain the frequency fundamental thereof as an output.

3. In a rate-to-amplitude converter, a synchronizer, means for applying a data signal having a data-dependent pulse rate to said synchronizer, means for periodically applying first timing pulses to the output portion of said synchronizer, a flip-flop circuit connected to said synchronizer, means for periodically applying second timing pulses to said flip-flop circuit, each of said second timing pulses occurring a predetermined time period after the corresponding first timing pulse, an amplitude limiting circuit connected to said flip-flop circuit, and an averaging circuit connected to said amplitude limiting circuit.

4. The apparatus of claim 3 wherein said synchronizer comprises a magnetic core having a square loop characteristic, first and second transistors having respective emitters tied together, said data signal being coupled to the base of said first transistor, said first timing pulses being coupled to the base of said second transistor, first and second core windings coupled to the base of respective first and second transistors, third and fourth core windings coupled to the collector of respective first and second transistors, and a fifth core winding coupled to said flip-flop circuit.

5. The apparatus of claim 4 wherein said flip flop circuit comprises a pair of transistors having respective emitters thereof connected together, each transistor collector being coupled to the base of the opposite transistor of said pair, said fifth core winding being coupled to the base of one transistor of said pair, said second timing signal being coupled to the base of the other transistor of said pair.

6. The apparatus of claim 3 wherein said amplitude limiting circuit comprises a transistor having its base coupled to said flip flop circuit, a series diode combination having one terminal resistively coupled to the collector of said transistor, said diode combination being shunted by a resistor and having the other terminal connected to ground.

7. The apparatus of claim 3 wherein said averaging circuit comprises a series resistance having one terminal connected to said amplitude limiting circuit, and an averaging capacitor connected between the other resistor terminal and ground.

8. The apparatus of claim 7 and further comprising a series capacitor connected intermediate said limiting circuit and said series resistance, said series capacitor being large compared to said averaging capacitor, and an emitter follower having its base connected to the junction of said series resistance and said averaging capacitor and having its emitter coupled by a diode to the junction of said series resistance and said series capacitor.

References Cited in the file of this patent

UNITED STATES PATENTS

| | | |
|---|---|---|
| 2,683,813 | Friedman | July 13, 1954 |
| 2,867,767 | McGillem | Jan. 6, 1959 |
| 2,878,467 | Barker | Mar. 17, 1959 |
| 2,881,422 | Vetter | Apr. 7, 1959 |
| 2,885,662 | Hansen | May 5, 1959 |

UNITED STATES PATENT OFFICE
CERTIFICATE OF CORRECTION

Patent No. 3,094,629                                            June 18, 1963

Edward D. Ostroff et al.

It is hereby certified that error appears in the above numbered patent requiring correction and that the said Letters Patent should read as corrected below.

Column 3, line 39, after "output" insert -- is --; lines 43 and 44, for "freqeuncy" read -- frequency --; column 4, line 27, for "capactor" read -- capacitor --; line 43, for "is" read -- it --; column 5, line 13, after "input" insert -- pulse --.

Signed and sealed this 7th day of January 1964.

(SEAL)
Attest:
ERNEST W. SWIDER

Attesting Officer

EDWIN L. REYNOLDS

Acting Commissioner of Patents